(12) United States Patent
Ptolemy (10) Patent No.: US 6,438,807 B1
(45) Date of Patent: Aug. 27, 2002

(54) ADJUSTABLE COLLAR WITH LONGITUDINAL MECHANICAL INTERLOCK

(76) Inventor: R. Bruce Ptolemy, 6952 NW. Ronler Way, #2324, Hillsboro, OR (US) 97124

( * ) Notice: Subject to any disclaimer, the term of this patent is extended or adjusted under 35 U.S.C. 154(b) by 0 days.

(21) Appl. No.: 09/628,701

(22) Filed: Jul. 31, 2000

Related U.S. Application Data (60) Provisional application No. 60/149,023, filed on Aug. 13, 1999.

(51) Int. Cl.⁷ ............................................... B65D 63/00
(52) U.S. Cl. .................. 24/484; 24/30.5 R; 24/20 CW; 24/20 R; 24/16 PB; 119/856; 119/860
(58) Field of Search ................................. 119/856, 860, 119/792; 24/484, 17 B, 22, 20 CW, 483, 68 C, 559, 30.5 R, 566, 598.2, 20 R, 16 PB (56) References Cited

U.S. PATENT DOCUMENTS

| | | | | |
|---|---|---|---|---|
| ,210,560 A | * | 12/1878 | Robertshaw | 24/20 CW |
| 1,379,476 A | * | 5/1921 | Parr | 24/20 CW |
| 2,285,850 A | * | 6/1942 | Weeks | 24/30.5 R |
| 3,303,669 A | * | 2/1967 | Oetiker | 24/20 CW |
| 4,280,258 A | * | 7/1981 | Kunze | 24/30.5 R |
| 4,872,242 A | * | 10/1989 | Allan | 24/16 PB |
| 5,109,576 A | * | 5/1992 | Teekell et al. | 24/30.5 R |

FOREIGN PATENT DOCUMENTS

| | | | | |
|---|---|---|---|---|
| GB | 0898124 | * | 6/1962 | 24/484 |

* cited by examiner

Primary Examiner—Victor Sakran
(74) Attorney, Agent, or Firm—John Smith-Hill; Smith-Hill and Bedell

(57) ABSTRACT

A flexible strip of resiliently deformable material is of substantially uniform cross sectional form. At one side, the strip has an interior cavity which opens at that side of the strip, the cavity being wider than the opening; and the strip is substantially complementary at the other side.

18 Claims, 8 Drawing Sheets

ADJUSTABLE COLLAR WITH LONGITUDINAL MECHANICAL INTERLOCK

CROSS-REFERENCE TO RELATED APPLICATION

This application claims benefit of Provisional Application No. 60/149,023 filed Aug. 13, 1999. The entire disclosure of Provisional Application No. 60/149,023 is hereby incorporated by reference herein.

BACKGROUND OF THE INVENTION

This invention relates to a configuration for a flexible strip of material suitable for providing an adjustable collar for an animal, including a pet such as a dog or cat.

Conventional flea and tick collars for pets are made up of a strip of flexible polymer material treated with an agent for killing insects, such as fleas and ticks, without harming the pet wearing the collar. The collar is held in position around the pet's neck by a buckle attached to the strip at one end. The opposite end of the strip is threaded through the buckle, which is typically provided with a barb for digging into the polymer material. The conventional collar is subject to disadvantage. For example, the buckle can be awkward to use for persons lacking dexterity. Also, excess length of the strip protruding from the buckle can interfere with the pet's movement and should therefore be either secured or removed. Further, the need to provide the buckle and attach the buckle to the strip of polymer material adds significantly to the cost of manufacturing the collar.

SUMMARY OF THE INVENTION

According to a first aspect of the present invention there is provided an article of manufacture comprising a flexible strip of resiliently deformable material, the flexible strip being of substantially uniform cross sectional form and having first and second sides, and wherein the strip has an interior cavity which opens at the first side of the strip, the cavity being wider than the opening, and at the second side the strip is substantially complementary to the first side.

According to a second aspect of the present invention there is provided an article of manufacture comprising a flexible strip having first and second opposite ends, a first side which is substantially uniformly of a first surface configuration and a second side which is substantially uniformly of a second surface configuration, the first and second surface configurations being releasably engageable to form an endless band by overlapping a first length segment at the first end of the strip with a second length segment at the second end of the strip, with the first side of the first length segment confronting the second side of the second length segment, and pressing the overlapping length segments together.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
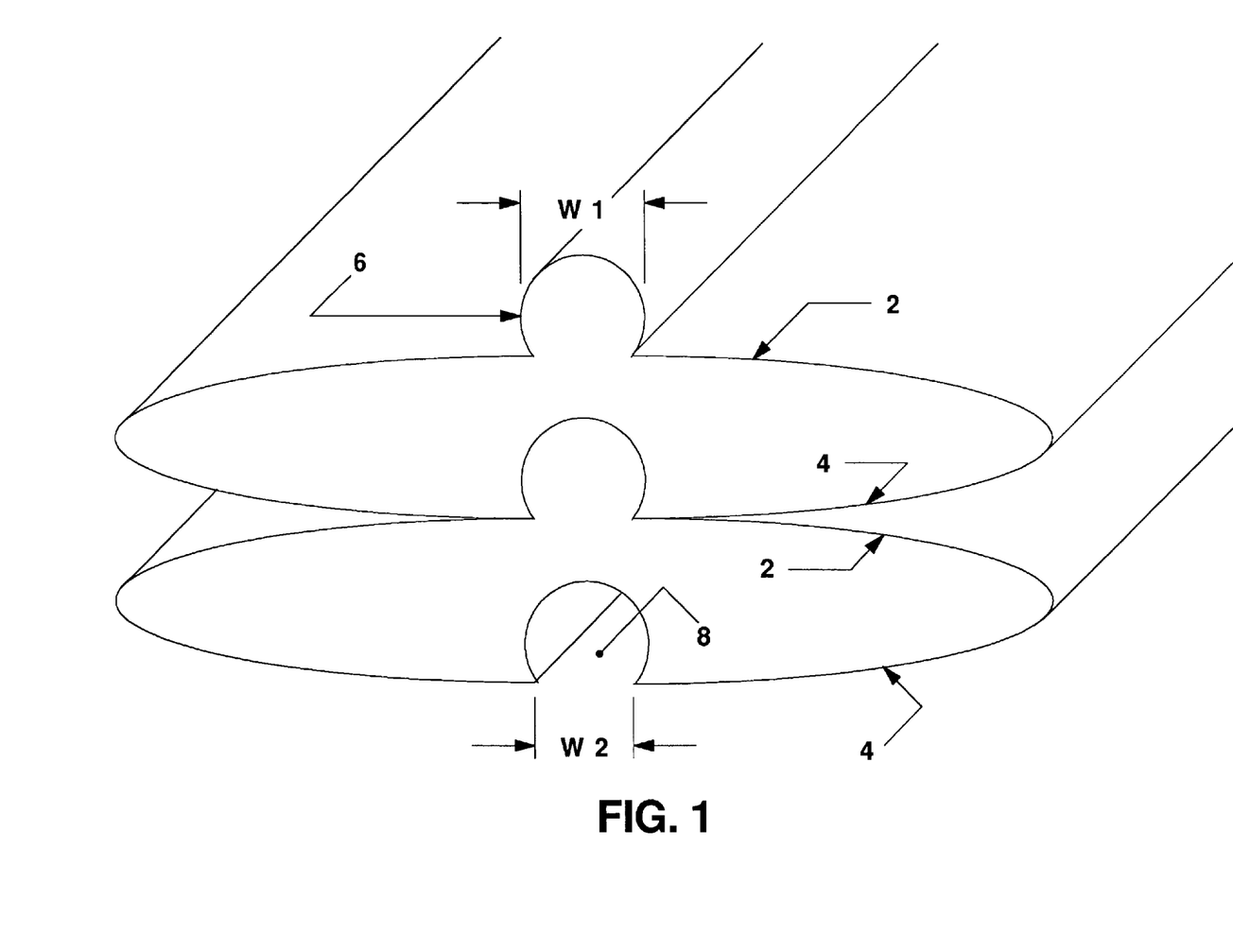
FIG. 1 is a cross-sectional view of a first strip of material in accordance with the present invention.

The strip shown in FIG. 1 is of indeterminate length and is of uniform cross-sectional configuration over its entire length. The strip has two main sides 2 and 4. When viewed in cross-section, the strip has a protuberance 6 at its first side 2 and a receptacle 8 at its second side 4. The protuberance and the receptacle are complementary. The maximum width W1 of the protuberance 6 is greater than the width W2 of the receptacle at the opening of the receptacle 8 from the side 4 of the strip.

Figure 2:
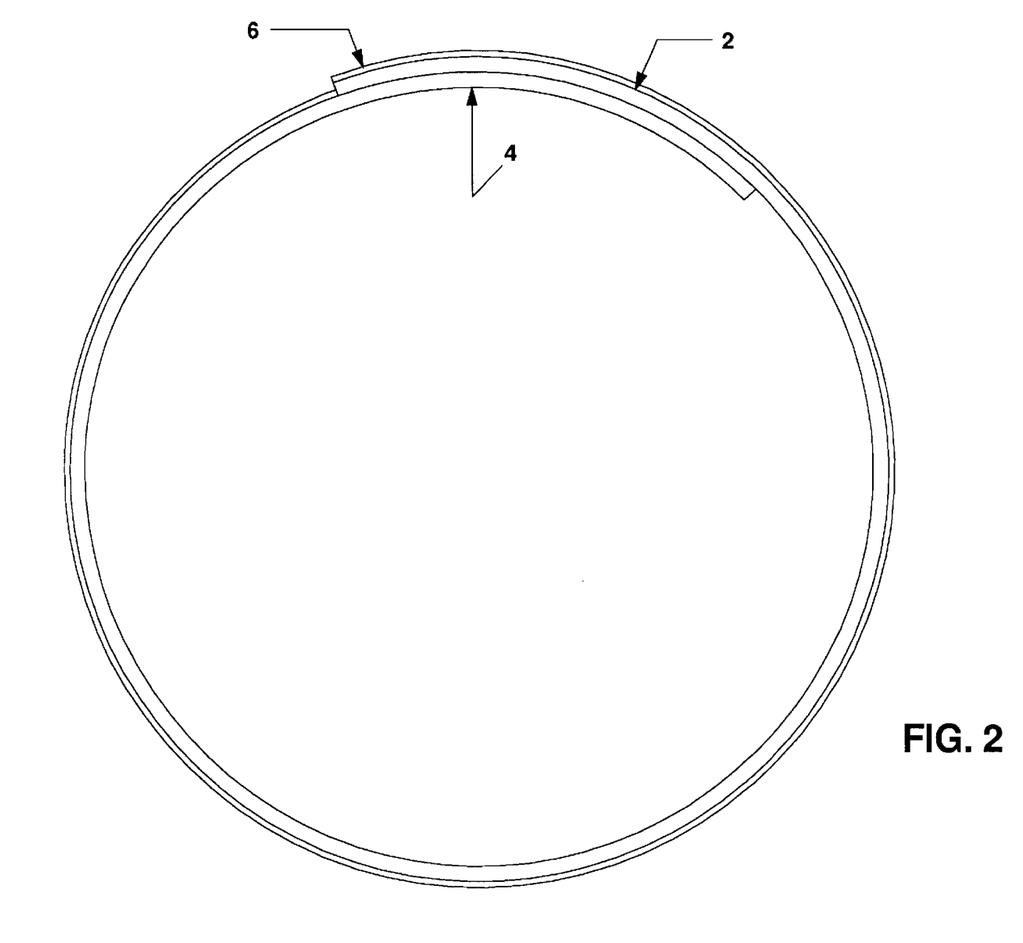
FIG. 2 is a side view of a collar formed from the strip shown in FIG. 1.

The strip is flexible and resiliently deformable and can be formed into a loop or ring, with a first length segment overlapping a second length segment and the first side 2 of the first length segment in confronting relationship with the second side 4 of the second length segment. If the two overlapping length segments are squeezed together, the protuberance 6 snaps into the receptacle 8 and the two overlapping length segments interlock so that the strip forms an endless band as shown in FIG. 2. Frictional engagement between the exterior surface of the protuberance 6 and the interior surface of the receptacle resists opening of the band into a strip simply by tension applied to the collar or by vibration of the collar, but the band can be opened into a strip by peeling the two interlocking segments apart, releasing the protuberance 6 from the receptacle 8.

The strip shown in FIG. 1 can be used to provide a pet collar without need for a buckle. The size of the collar is adjustable by selecting the length of the overlapping segments.

The strip is inexpensive to manufacture, and can be made from synthetic polymer material using conventional extruding techniques. In the case of the strip being used as a pet collar, the polymer material can be treated with a suitable agent for killing ticks and fleas. In the case of a collar for a dog, the polymer material may be treated with an agent for masking the odor of the dog. Particularly in the case of a collar for larger animals, such as cows, the strip can be made of colored material for identification.

The strip is not limited in application to collars for animals, such as pets, but can also be used as a belt, strap or tie. Further, the invention is not restricted to the particular configuration of the mechanical interlocking means and other configurations can be used instead.

Figure 3:
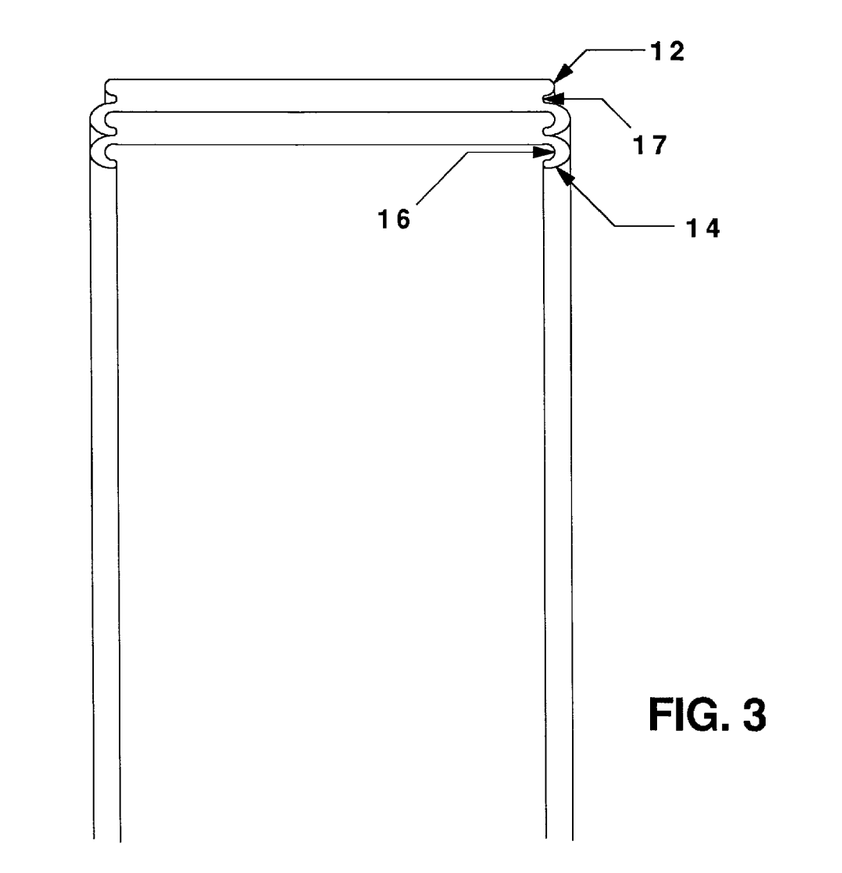
FIG. 3 is a cross-sectional view of a second strip of material in accordance with the present invention.

In the case of FIG. 1, the maximum width W1 of the protuberance is substantially less than the maximum width of the strip. FIG. 3 illustrates a strip in which the protuberance extends over substantially the entire width of the strip. At each edge of the strip shown in FIG. 3 there is a lip 12 defined by a recess 17 and a U-shaped structure 14 defining a recess 16. When two overlapping length segments of the strip are brought into confronting relationship and are squeezed together, the U-shaped structures are forced apart and the lips 12 snap into the recesses 16. The overlapping length segments interlock so that the strip forms an endless band. The band can be opened into a strip by peeling the two interlocking segments apart, releasing the lips 12 from the recesses 16.

When the strip shown in FIG. 3 is formed into an endless band, a slip of sheet-form material, such as paper, can be trapped between the overlapping length segments. The sheet form material may bear a message, for example a name or telephone number, which can be read without opening the band if the material of the strip is transparent.

Figure 4:
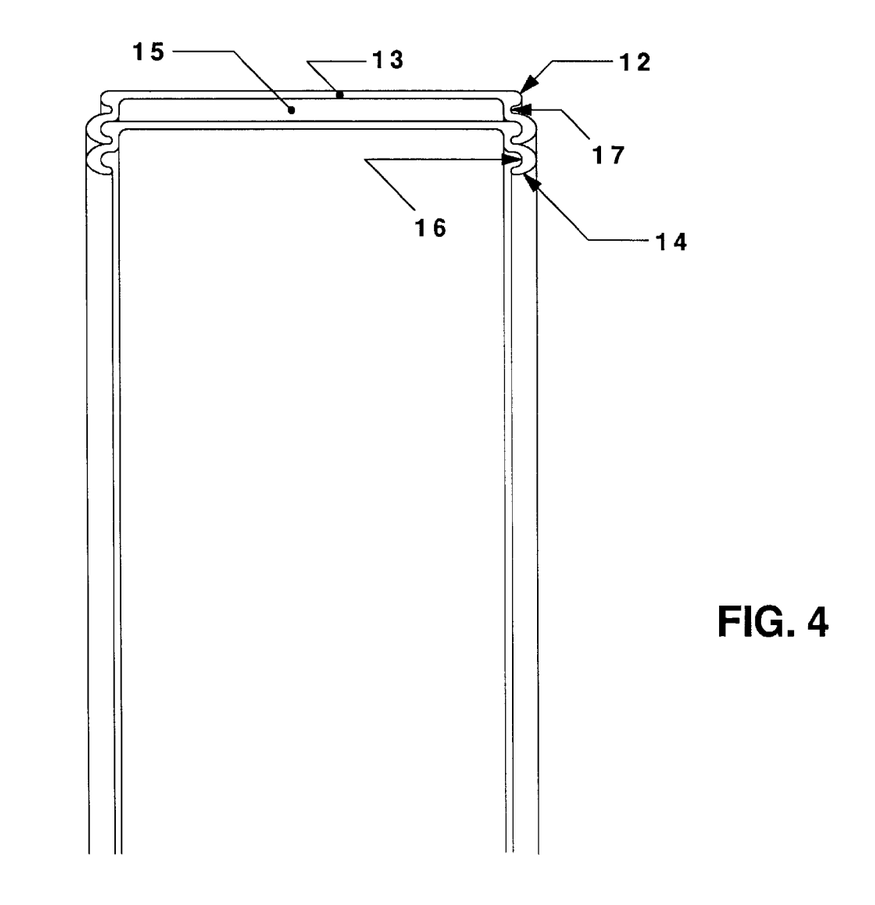
FIG. 4 is a cross-sectional view of a third strip of material in accordance with the present invention.

FIG. 4 illustrates a strip that is functionally similar to that shown in FIG. 3 but is less expensive to manufacture because is requires less material. The underside of the strip is recessed. When two overlapping length segments of the strip are brought into confronting relationship and are squeezed together, the body 13 of the outer segment flexes, deforming the recess of the outer segment and causing the U-shaped structures to spread and allow the lips 12 of the inner segment to snap into the recesses 16 of the outer segment. The overlapping length segments interlock so that the strip forms an endless band.

The recess in the underside of the strip provides an additional advantage of forming a cavity 15, which can accommodate an article, such as a metal or plastic identification or coding tag, between the overlapping length segments of the band. Preferably, the tag is resilient and is flexed slightly when it is placed in the cavity. In this case, the frictional engagement between the tag and the strip holds the tag securely in position in the cavity. The cavity also affords the possibility of accommodating a chemically treated ribbon or slip between the overlapping length segments of the band. For example, in the case of a dog collar, the strip may be treated with an odor masking agent and the ribbon or slip may be treated with an agent for killing ticks and fleas.

Figure 5:
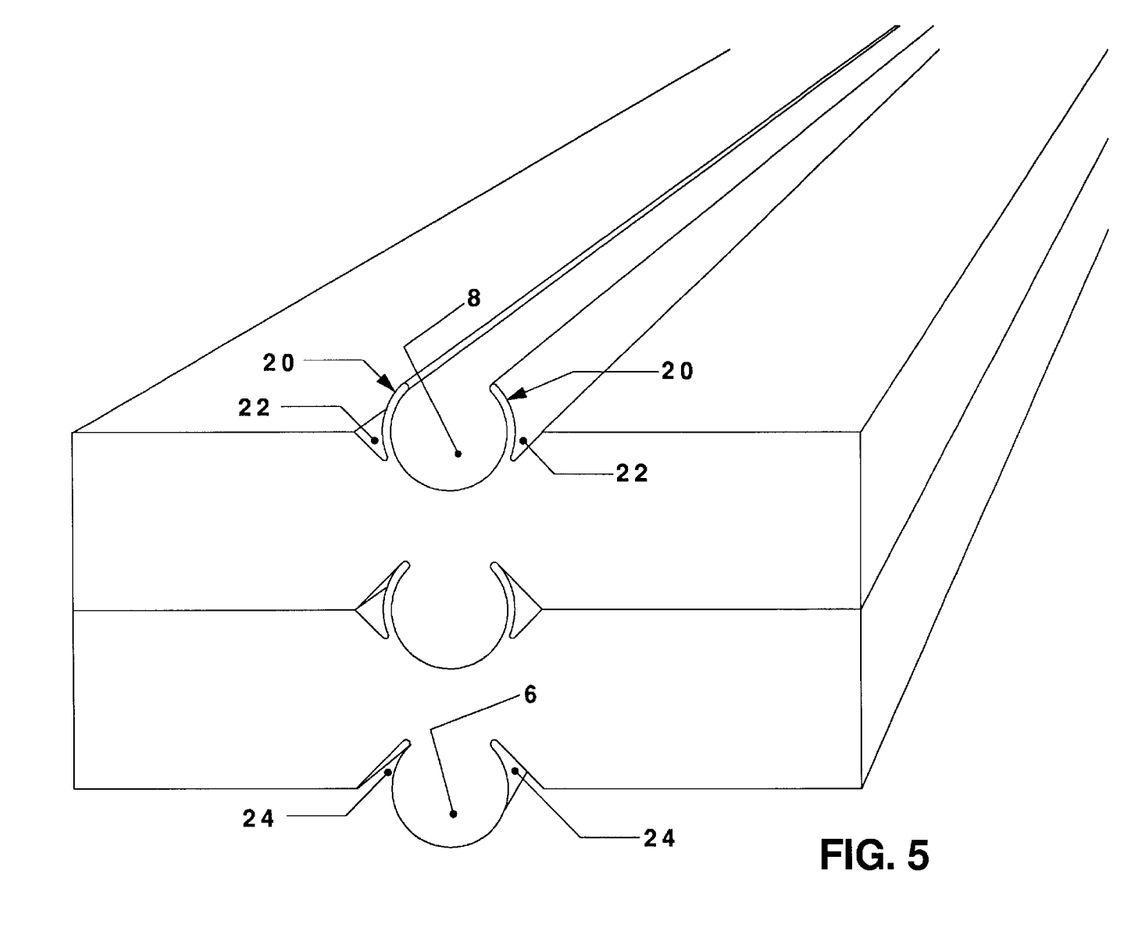
FIG. 5 is a cross-sectional view of a fourth strip of material in accordance with the present invention.

The physical properties of synthetic polymer materials vary widely depending on the chemical composition and molecular weight of the material. In particular, some materials are stiffer and less flexible than others. Further, the physical properties of some synthetic polymer materials, particularly materials that have been modified by addition of chemical agents such as agents for killing ticks and fleas, change with time, and the materials become stiffer. In the case of a strip having the configuration shown in FIG. 1 and made of a high molecular weight material or a material that has deteriorated through age, it may be difficult to apply sufficient force to snap the protuberance 6 into the receptacle 8 using finger pressure. The configuration of the strip shown in FIG. 5 has been designed to avoid this disadvantage. In the case of FIG. 5, the receptacle is defined between two relatively thin-walled wings 20, which extend from channels 22. This structure allows the wings to flex apart, to admit the protuberance 6 into the receptacle 8. When the overlapping length segments are interlocked, the wings are accommodated by grooves 24 on either side of the protuberance 6.

Figure 6:
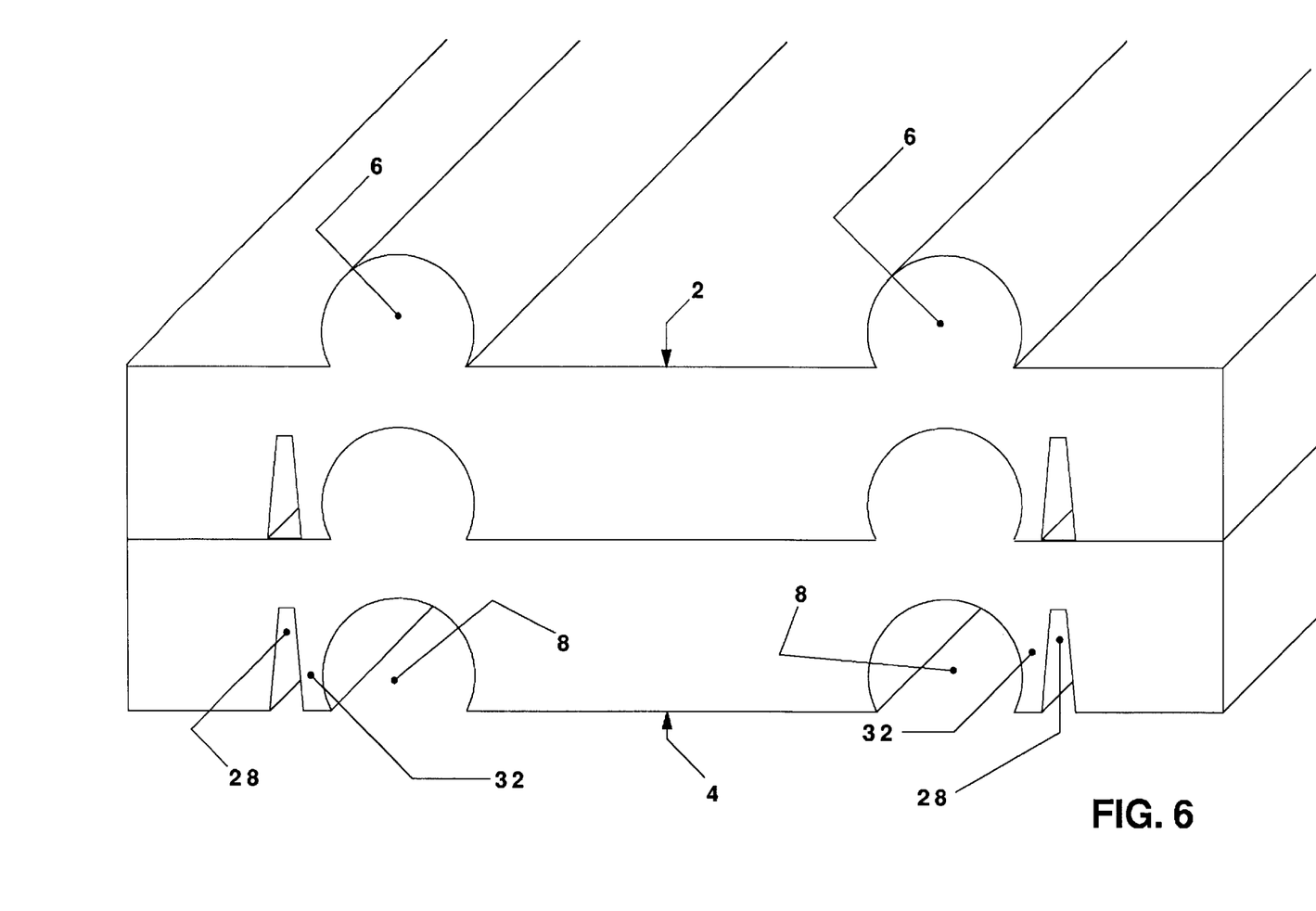
FIG. 6 is a cross-sectional view of a fifth strip of material in accordance with the present invention.

Referring to FIG. 6, the strip may have multiple protuberances 6 at its first side 2 and a corresponding number of receptacles 8 at its second side 4. This provides a stronger interlock when the two overlapping length segments are snapped together. Further, in the case of FIG. 6, there is a slot or channel 28 adjacent each receptacle 8. When the two overlapping length segments are snapped together, the rib 32 between the receptacle 8 and the channel 28 is able to flex and allow the protuberance to enter the receptacle. Thus, the structure shown in FIG. 6 also addresses the issue of difficulty in snapping the overlapping length segments together in the event of the strip is made of a high molecular weight material or a material that has deteriorated through age.

Figure 7:
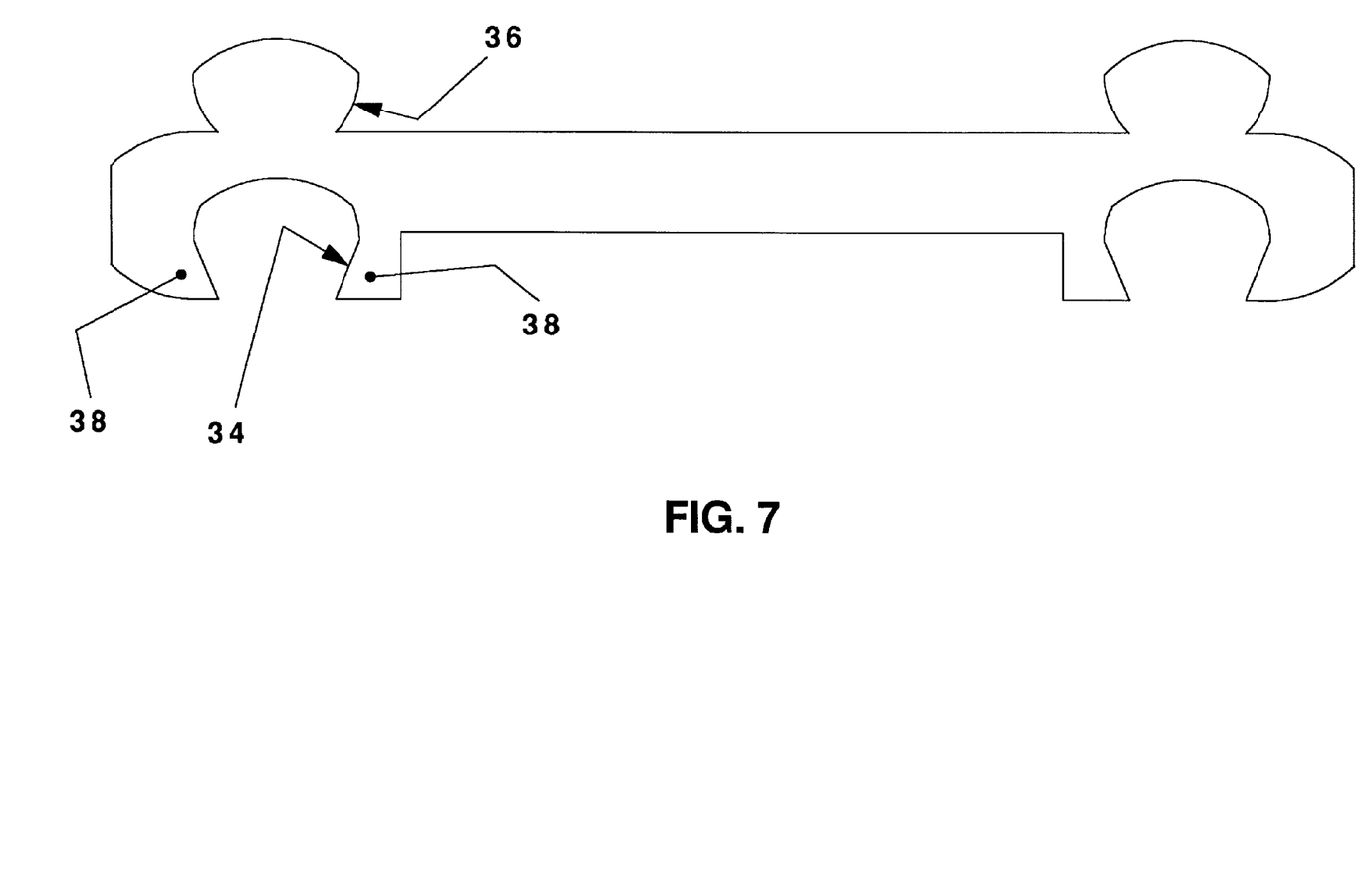
FIG. 7 is a cross-sectional view of a sixth strip of material in accordance with the present invention.

A potential disadvantage of the configurations described with reference to FIGS. 1–6 is that the cross-sectional form of the protuberance matches the cross-sectional form of the receptacle and accordingly the frictional force that resists longitudinal sliding movement of the interlocked segments can be quite small. FIG. 7 illustrates a configuration in which the frictional force that must be overcome in order to cause longitudinal sliding movement of the two segments is considerably larger. Referring to FIG. 7, it will be seen that whereas the surfaces 34 of the receptacles are substantially flat when viewed in section, the corresponding surfaces 36 of the protuberance are convexly curved and consequently there is an interference fit between the protuberance and the receptacle when the protuberance engages the receptacle. The protuberance is under a compressive force between the surfaces 34 bounding the receptacle, and correspondingly the jaws 38 of the receptacle are forced apart from the relaxed condition by the protuberance. The forces created due to the interference fit of the receptacle in the protuberance result in stronger frictional engagement between the two segments of the strip.

A possible disadvantage of the configuration shown in FIGS. 3 and 4 is that the U-shaped structure 14 may pucker or be otherwise distorted when the collar is formed into a circular configuration so that the U-shaped structures do not spread when the two overlapping segments are pressed together but collapse under the force applied by the lip 12. This possibility can be reduced or eliminated by extruding the strip using a softer polymer material to form the structure 14 and a harder material to form the lip 12 and body 13. Techniques for forming an extrusion of two polymer materials are known in the art and will not be described herein.

Figure 8:
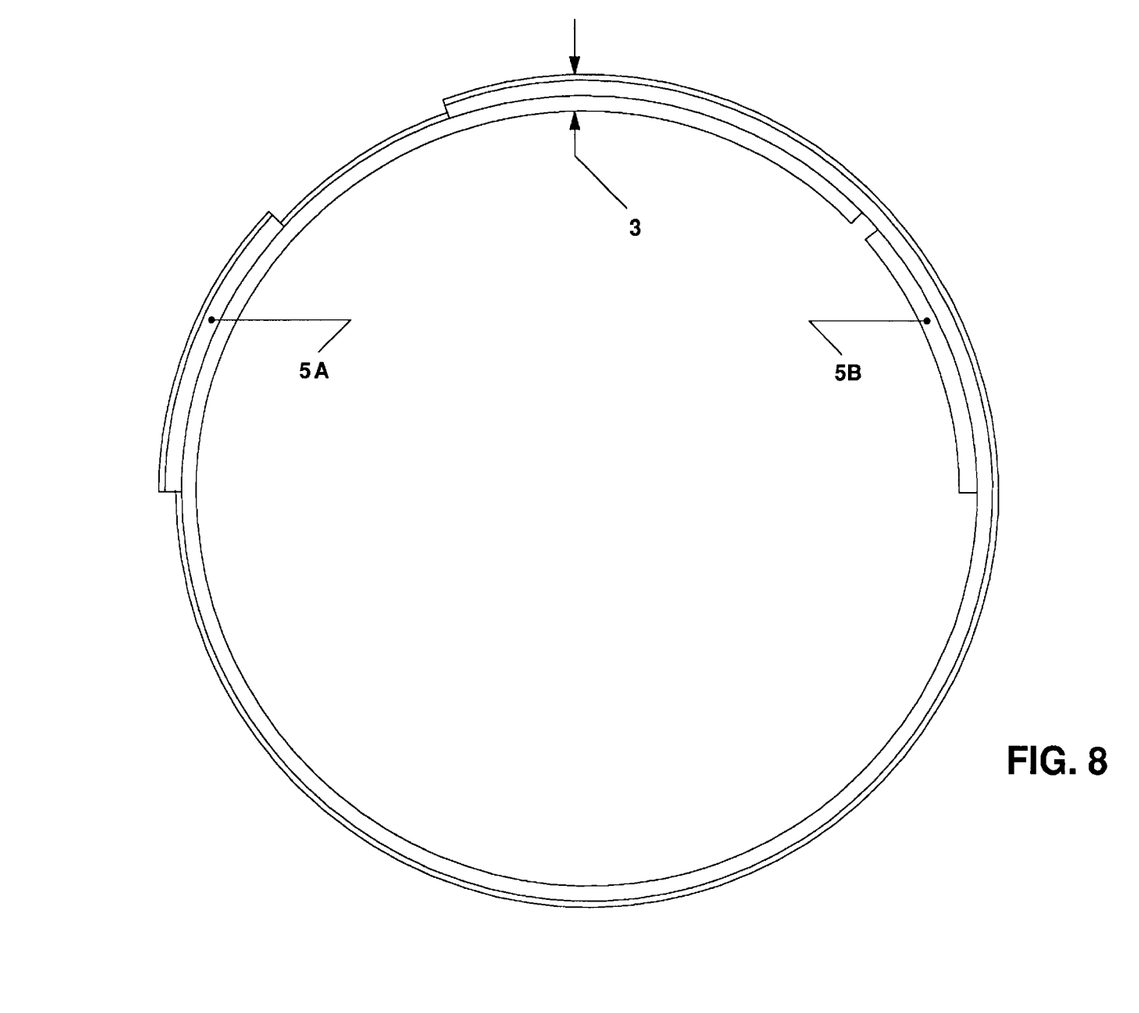
FIG. 8 illustrates a collar made using the strip shown in FIG. 3 or 4.

FIG. 8 shows a collar 3 made using a strip of the material having the profile shown in FIG. 3, 4, 6 or 7. FIG. 8 also shows a shorter strip 5 of material having the same profile as the material of the collar 3 snapped to the collar 3. In FIG. 8, two strips 5A and 5B, snapped to the exterior and interior respectively of the collar 3, are shown in order to illustrate both possibilities, but it will be appreciated that in practice only one strip 5 would normally be used. The strip 5 can be used to attach an identification tag or slip to the collar 3, in the manner described with reference to FIGS. 3 and 4 but independently of the overlapping length segments of the strip forming the collar 3. This is advantageous because the strip 5 can be of a different material from the strip forming the collar 3. In particular, if it should prove desirable to manufacture the collar 3 from opaque or translucent material, the strip 5 can nevertheless be made of transparent material, allowing the identification tag or slip to be read through the strip 5.

The strips that have been described so far are uniform in cross-section, which is advantageous with regard to manufacture. It may, however, be desirable to provide some non-uniformity, particularly with a view to increasing frictional resistance against the protuberance sliding lengthwise from the receptacle. This may be accomplished by use of an embossing tool for deforming, specifically roughening, the protuberance as it leaves the extrusion die but while it is still plastic.

It will be appreciated that the invention is not restricted to the particular embodiment that has been described, and that variations may be made therein without departing from the scope of the invention as defined in the appended claims and equivalents thereof. In the claims, a reference to an element, such as a cavity, in the singular is not intended to exclude the possibility of multiple such elements unless other circumstances indicate the contrary intention.

What is claimed is:

1. An article of manufacture comprising a flexible strip of resiliently deformable material, the flexible strip having first and second opposite end regions and first and second sides and being of uniform cross sectional form over its length, and wherein the strip has an interior cavity which opens at the first side of the strip, the cavity being wider than the opening, and is provided with a substantially complementary protuberance at the second side, whereby the strip may be formed into a closed loop by overlapping the first end region of the strip with the second end region of the strip, with the first side of the first end region confronting the second side of the second end region, and pressing the overlapping end regions together and thereby forcing the protuberance into the cavity.

2. An article according to claim 1, wherein the strip has two interior cavities which open at the first side of the strip, the cavities being wider than the respective openings.

3. An article according to claim 1, wherein the strip has two opposite longitudinal edges and each edge is formed with a U-shaped structure and the interior cavity is defined between the two U-shaped structures.

4. An article according to claim 3, wherein the U-shaped structure defines a recess and each edge of the strip is formed with a lip which is substantially complementary to the recess.

5. An article according to claim 1, wherein the strip has first and second opposite longitudinal edges and the interior cavity extends over substantially the entire width of the strip.

6. An article according to claim 5, wherein the strip is formed with a secondary cavity at the first side of the strip opening from the base of said interior cavity.

7. An article of manufacture comprising a flexible strip of resiliently deformable material treated with an agent for controlling insects that are harmful to pets, the flexible strip having first and second opposite end regions and first and second sides and being of substantially uniform cross sectional form over its length, and wherein the strip has an interior cavity which opens at the first side of the strip, the cavity being wider than the opening, and is provided with a substantially complementary protuberance at the second side, whereby an endless band may be formed by overlapping the first end region of the strip with the second end region of the strip, with the first side of the first end region confronting the second side of the second end region, and pressing the overlapping end regions together and thereby forcing the protuberance into the cavity.

8. An article according to claim 7, wherein the strip has two interior cavities which open at the first side of the strip, the cavities being wider than the respective openings.

9. An article according to claim 7, wherein the strip has two opposite longitudinal edges and each edge is formed with a U-shaped structure and the interior cavity is defined between the two U-shaped structures.

10. An article according to claim 9, wherein the U-shaped structure defines a recess and each edge of the strip is formed with a lip which is substantially complementary to the recess.

11. An article according to claim 7, wherein the strip has first and second opposite longitudinal edges and the interior cavity extends over substantially the entire width of the strip.

12. An article according to claim 11, wherein the strip is formed with a secondary cavity at the first side of the strip opening from the base of said interior cavity.

13. A pet collar comprising a flexible strip of resiliently deformable material treated with an agent for controlling insects that are harmful to pets, the flexible strip having first and second opposite end regions and first and second sides and being of substantially uniform cross sectional form over its length, and wherein the strip has an interior cavity which opens at the first side of the strip, the cavity being wider than the opening, and is provided with a substantially complementary protuberance at the second side, whereby the strip may be wrapped around the neck of a pet and held in position as a collar by overlapping the first end region of the strip with the second end region of the strip, with the first side of the first end region confronting the second side of the second end region, and pressing the overlapping end regions together and thereby forcing the protuberance into the cavity.

14. A pet collar according to claim 13, wherein the strip has two interior cavities which open at the first side of the strip, the cavities being wider than the respective openings.

15. An article according to claim 13, wherein the strip has two opposite longitudinal edges and each edge is formed with a U-shaped structure and the interior cavity is defined between the two U-shaped structures.

16. An article according to claim 15, wherein the U-shaped structure defines a recess and each edge of the strip is formed with a lip which is substantially complementary to the recess.

17. An article according to claim 13, wherein the strip has first and second opposite longitudinal edges and the interior cavity extends over substantially the entire width of the strip.

18. An article according to claim 17, wherein the strip is formed with a secondary cavity at the first side of the strip opening from the base of said interior cavity.

* * * * *